United States Patent
Chen et al.

(10) Patent No.: US 9,493,013 B2
(45) Date of Patent: Nov. 15, 2016

(54) INKJET INK SET

(75) Inventors: Xiaohe Chen, San Diego, CA (US);
Pradeep Kumar Koyadan Kizhakkedath, Kerala (IN); Dennis P. Parazak, Oceanside, CA (US);
Keshava A. Prasad, San Marcos, CA (US); Savka Ilieva Stoeva, San Diego, CA (US); Yi-Hua Tsao, San Diego, CA (US); Tze Hwei Tseeng, San Diego, CA (US); Ervin Mubarekyan, Sugar Land, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/982,174

(22) PCT Filed: Jan. 31, 2011

(86) PCT No.: PCT/US2011/023232
§ 371 (c)(1),
(2), (4) Date: Jul. 26, 2013

(87) PCT Pub. No.: WO2012/105949
PCT Pub. Date: Aug. 9, 2012

(65) Prior Publication Data
US 2013/0307914 A1    Nov. 21, 2013

(51) Int. Cl.
*B41J 2/21*        (2006.01)
*C09D 11/322*    (2014.01)
(Continued)

(52) U.S. Cl.
CPC .............. *B41J 2/2107* (2013.01); *B41J 2/2114* (2013.01); *C09D 11/322* (2013.01); *C09D 11/40* (2013.01); *C09D 11/54* (2013.01)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ........... 347/100, 95, 96, 101, 21, 20, 88, 99, 347/102; 106/31.6, 31.13, 31.27; 523/160, 523/161
See application file for complete search history.

(56) References Cited

U.S. PATENT DOCUMENTS

| 5,043,381 A |   | 8/1991  | Coogan et al. |
|-------------|---|---------|---------------|
| 5,274,025 A | * | 12/1993 | Stockl .................... C08L 67/00 524/513 |

(Continued)

FOREIGN PATENT DOCUMENTS

| CN | 101405356 | 4/2009 |
| EP | 2216374   | 8/2010 |

(Continued)

OTHER PUBLICATIONS

International Search Report and Written Opinion for PCT/US2011/023232 dated Oct. 31, 2011 (11 pages).

*Primary Examiner* — Manish S Shah
(74) *Attorney, Agent, or Firm* — Dierker & Kavanaugh, P.C.

(57) ABSTRACT

An inkjet ink set includes a black ink, a yellow ink, a cyan ink, and a magenta ink. The magenta ink includes an ink vehicle including a polyurethane binder, and a dispersed magenta pigment in the ink vehicle. The magenta pigment is chosen from Pigment Red 282.

12 Claims, 6 Drawing Sheets

(51) Int. Cl.
*C09D 11/40* (2014.01)
*C09D 11/54* (2014.01)

(56) References Cited

U.S. PATENT DOCUMENTS

| | | | |
|---|---|---|---|
| 5,891,231 A | 4/1999 | Gnerlich et al. | |
| 6,136,890 A | 10/2000 | Carlson et al. | |
| 6,193,361 B1* | 2/2001 | Wen | 347/96 |
| 6,498,222 B1* | 12/2002 | Kitamura et al. | 347/100 |
| 6,632,858 B1 | 10/2003 | Pears et al. | |
| 6,864,302 B2 | 3/2005 | Miyabayashi | |
| 6,908,185 B2 | 6/2005 | Chen et al. | |
| 6,933,329 B1 | 8/2005 | Meyrick et al. | |
| 7,041,163 B2 | 5/2006 | Roman et al. | |
| 7,677,714 B2 | 3/2010 | Sarkisian et al. | |
| 2003/0078320 A1 | 4/2003 | Yatake | |
| 2003/0166742 A1* | 9/2003 | Hirasa et al. | 523/160 |
| 2004/0092622 A1 | 5/2004 | Pearlstine et al. | |
| 2005/0182154 A1 | 8/2005 | Berge et al. | |
| 2005/0243121 A1* | 11/2005 | Onishi | 347/106 |
| 2006/0084720 A1* | 4/2006 | Tyvoll | B41M 7/00 523/160 |
| 2006/0227194 A1* | 10/2006 | Hoshino | 347/102 |
| 2007/0097193 A1 | 5/2007 | Ma et al. | |
| 2008/0022887 A1* | 1/2008 | Tanoue et al. | 106/31.2 |
| 2008/0117273 A1* | 5/2008 | Yamashita et al. | 347/96 |
| 2008/0207805 A1 | 8/2008 | Blease et al. | |
| 2008/0295734 A1 | 12/2008 | Deroover | |
| 2009/0033729 A1 | 2/2009 | Bauer et al. | |
| 2009/0239996 A1 | 9/2009 | Saito et al. | |
| 2009/0244116 A1* | 10/2009 | Ohnishi | 347/6 |
| 2009/0295893 A1* | 12/2009 | Akiyama | B41M 5/0017 347/96 |
| 2010/0021831 A1* | 1/2010 | Hall-Goulle | 430/7 |
| 2010/0201768 A1* | 8/2010 | Udagawa et al. | 347/100 |
| 2010/0240830 A1 | 9/2010 | Shimohara | |

FOREIGN PATENT DOCUMENTS

| | | |
|---|---|---|
| EP | 2236567 | 10/2010 |
| JP | 2009280749 | 12/2009 |

* cited by examiner

INKJET INK SET

BACKGROUND

The present disclosure relates generally to inkjet ink sets.

Inkjet printing systems are commonly used as an effective way of producing images on a print medium, such as paper. In some instances, an ink set (which may include two or more different colored inks) may be used as an ink source for the inkjet printing system. In an example, ink droplets (formed from one or more of the inks that are part of an ink set) are ejected from a nozzle at high speed by the inkjet system onto the paper to produce an image thereon. This image may include photos, graphics, texts, or combinations thereof.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the ink set, as disclosed herein, include a black ink, a yellow ink, a cyan ink, and a magenta ink, where the inks, when printed, exhibit improved durability, at least in terms of resistance to highlighter smear and dry rub. The printed inks of the ink set also exhibit improved print quality (e.g., in terms of color gamut), as well as improved reliability (e.g., in terms of nozzle health and kogation) at least during high-speed printing (e.g., during the printing of at least one hundred pages per minute).

An example of the ink set includes a black ink, a yellow ink, a cyan ink, and a magenta ink. Each of these inks includes a dispersed colorant in an ink vehicle. As used herein, the term "ink vehicle" refers to the combination of at least one or more solvents and water to form a vehicle in which the colorant is placed to form an ink. It is to be understood that the respective ink vehicles for the black ink, the yellow ink, the cyan ink, and the magenta ink are substantially the same in that the these vehicles each include a solvent and a binder. It is further to be understood that the ink vehicle for these respective inks is formulated so that the vehicle is compatible with polyurethane as a binder (described in further detail below) to improve decap. In some examples, the ink vehicles further include an additive chosen from a surfactant, a biocide, an anti-kogation agent, and/or a pH buffering agent.

It is to be understood that the ink vehicle for each of the inks of the ink set may include one solvent, or a combination of two or more solvents. Some examples of solvents that may be used include a hydantoin glycol (such as, e.g., 1,3-bis(2-hydroxyethyl)-5,5-dimethylhydantoin), 1,(2-hydroxyethyl)-2-pyrrolidinone, 1-(2-hydroxyethyl)-2-imidazolidinone, tetratethylene glycol, 1,2,6-hexanetriol, glycerol, glycerol propoxylate, glycerol polyoxyethyl ether (LEG-1), and/or the like, and/or combinations thereof. In an example, the amount of solvent(s) ranges from about 5 wt % to about 20 wt % of the total weight of the ink.

The dispersant is used to disperse the colorant in the inks. Some examples of dispersants that may be used include styrene acrylic polymers containing one or more carboxylate groups. These styrene acrylic polymers also have a weight average molecular weight ranging from about 5000 to about 20,000, and have an acid number ranging from about 120 to about 200. Examples of such styrene acrylic polymers include JONCRYL® 671, JONCRYL® 693, JONCRYL® 678, all of which are available from BASF Corp. (Germany). In an example, the dispersant is present in an amount ranging from about 0.3 wt % to about 3 wt % of the entire weight of the ink.

In an example, the ink vehicle of the inks of the ink set (e.g., of the black ink, the yellow ink, the cyan ink, and the magenta ink) includes a polyurethane binder. It is believed that the presence of the polyurethane in the inks, when formulated with the solvents identified above, advantageously improves the durability of the inks without sacrificing reliability. For instance, the addition of the polyurethane in the inks may improve durability, at least in part because the polyurethane acts as an adhesive that binds the colorant particles together. It is further believed that the selection of the polyurethane (e.g., a water-soluble polyurethane having an acid number and molecular weight as described herein) and the solvent promotes durability of the ink(s) without compromising its reliability. In an example, the polyurethane binder is chosen from a water-soluble polyurethane having a weight average molecular weight ranging from about 20,000 to about 100,000, and an acid number ranging from about 40 to about 60. In yet another example, the polyurethane binder is chosen from a polyurethane having a weight average molecular weight ranging from about 40,000 to about 45,000, and an acid number ranging from about 50 to about 55.

General descriptions of some examples of water-soluble polyurethane binders that may be used in the ink(s) of the ink set of the instant disclosure (provided that the polyurethanes are formulated to be within the weight average molecular weight ranges and acid number ranges specified herein) include those disclosed in U.S. Pat. No. 6,632,858 to Pears, et al., e.g., at column 1, line 30 through column 5, line 57; U.S. Pat. No. 6,933,329 to Meyrick, et al., e.g., at column 1, line 37 through column 4, line 8; U.S. Pat. No. 6,136,890 to Carlson, et al., e.g., at column 5, line 10 through column 12, line 11; and U.S. Pat. No. 5,043,381 to Coogan, et al., e.g., at column 2, line 30 through column 7, line 5. The contents of the cited portions of each of these U.S. patents are incorporated herein by reference.

In an example, the amount of the polyurethane binder present ranges from about 0.2 wt % to about 5 wt % of the entire weight of the ink.

In a further example, the ink vehicle also includes a surfactant, some examples of which include ethoxylated C11 to C15 secondary alcohols, a nonionic ethoxylated fluoroalkyl surfactant, sodium dodecyl sulfate, SURFYNOL® SEF (Air Products and Chemicals, Inc. (Lehigh Valley, Pa.)) or combinations thereof. The amount of surfactant ranges from about 0.05 wt % to about 1.5 wt %.

The ink vehicle for each of the inks may further include one or more additives chosen from biocides, anti-kogation agents, and/or pH buffering agents. The biocide may be added to the ink vehicles to protect the inks from bacterial growth and fungi. The biocide may be chosen from water-soluble biocides, examples of which includes PROXEL® GXL (Arch Chemicals, Inc. (Symrna, Ga.)), other commercially available biocides, or combinations thereof. In an example, the biocide is present in an amount ranging from about 0.01 wt % to about 0.5 wt %.

The anti-kogation agent may be added to the ink vehicles to reduce or prevent kogation, i.e., where ink residue builds up on surfaces of the heating element of the printer during printing. Examples of anti-kogation agents that may be used include a phosphate ester based on oleyl alcohol, LIPONIC™ EG-1 (Lipo Chemicals, Inc. (New York, N.Y.)), and/or combinations thereof. In an example, the ink vehicles include a combination of a phosphate ester based on oleyl alcohol and LIPONIC™ EG-1, where the phosphate ester based on oleyl alcohol is present in an amount ranging from about 0.01 wt % to about 1.5 wt % of the ink, and the LIPONIC™ EG-1 is present in an amount ranging from about 0.01 wt % to about 2 wt % of the ink.

The pH buffering agent may be used in the ink vehicle to modulate the pH of the ink so that the pH stays between the values of 8.5 and 10. Some non-limiting examples of buffering agents include Trizma Base (Aldrich Chemical (Milwaukee, Wis.)), 2-(N-morpholino)ethanesulfonic acid (MES), and 3-(N-morpholino)propanesulfonic acid (MOPS). The pH buffering agent, if used, may be present in an amount ranging from about 0.01 wt % to about 0.3 wt % of the ink.

In an example, the ink vehicles also include water as a balance. Generally, the amount of water is present in an amount ranging from about 60 wt % to about 90 wt % of the ink.

An example of the black ink for the ink set includes a dispersed black pigment in an ink vehicle for the black ink. In an example, the black pigment is chosen from water dispersible sulfur pigments such as solubilized Sulfur Black 1, materials such as carbon black, non-limiting examples of which include FW18, FW2, FW200 (all manufactured by Degussa Inc. (Dusseldorf, Germany)); MONARCH® 700, MONARCH® 800, MONARCH® 1000, MONARCH® 880, MONARCH® 1300, MONARCH® 1400, REGAL® 400R, REGAL® 330R, REGAL® 660R (all manufactured by Cabot Corporation (Boston, Mass.)); RAVEN® 5750, RAVEN® 250, RAVEN® 5000, RAVEN® 3500, RAVEN® 1255, RAVEN® 700 (all manufactured by Columbian Chemicals, Co. (Marietta, Ga.)), or derivatives of carbon black, and/or combinations thereof.

In an example, the amount of the black pigment present in the black ink ranges from about 1.5 wt % to about 3 wt % of the entire weight of the black ink. In a further example, the amount of the black pigment present in the black ink ranges from about 2.5 wt % to about 3 wt % of the entire weight of the black ink.

Without being bound to any theory, it is believed that a lower percentage of pigment in the black ink (e.g., a pigment loading that is less than or equal to 3 wt %) requires a longer time to evaporate the liquid-phase components of the ink (such as water), and thus a longer time for the pigment particles to agglomerate. This results in a lower agglomeration of the pigment, which may reduce any unfavorable issues related to decap. The lower amount of the pigment in the black ink also allows for easier servicing of the inkjet pen (or fluid ejector) between printing jobs, which also improves decap.

An example of the yellow ink includes a dispersed yellow pigment in an ink vehicle for the yellow ink. In an example, the yellow pigment is chosen from Pigment Yellow 74, Pigment Yellow 155, Pigment Yellow 213, or Pigment Yellow 128. The amount of the yellow pigment present in the yellow ink ranges from about 2 wt % to about 6 wt % of the entire weight of the yellow ink.

An example of the cyan ink includes a dispersed cyan pigment in an ink vehicle for the cyan ink. In an example, the cyan pigment is chosen from Pigment Blue 15:3 or Pigment Blue 15:4. The amount of the cyan pigment present in the cyan ink ranges from about 1 wt % to about 4 wt % of the entire weight of the cyan ink.

Further, an example of the magenta ink includes a dispersed magenta pigment (the magenta pigment is dispersed with, e.g., a styrene acrylic polymer) in an ink vehicle for the magenta ink. In an example, the magenta pigment is chosen from Pigment Red 282. Without being bound to any theory, it is believed that the image quality (in terms of color gamut) may be improved for a print formed by printing the inks of the ink set, where the magenta ink includes the Pigment Red 282 (PR 282) magenta pigment. For instance, PR 282 provides better chroma than Pigment Red 122 and exhibits a redder hue. This leads to a better red chroma for the PR 282 pigment when used in combination with a yellow ink. It is believed that the combination of a higher chroma and a redder hue leads to higher color gamut for the PR 282 compared with PR 122. In an example, the amount of the magenta pigment present in the magenta ink ranges from about 1 wt % to about 5 wt %.

In an example, the ink set may further include a fixing fluid composition (also referred to as a fixer or bonding agent) that may be applied (via, e.g., printing) to the paper before or after the ink(s) from the ink set is/are printed. The fixer may particularly be useful in instances where the ink set is used to print on media such as plain papers. The fixer includes a fixing agent dissolved in a vehicle, where the fixing agent is generally chosen from cationic polymers or soluble metal salts, and has a pH ranging from 4 to 7 so the fixer can react with an ink (such as one of the inks of the examples of the ink set disclosed herein) containing anionically dispersed pigments. The reaction between the fixer and the pigment immobilizes the pigment, and stratifies it on the surface of the paper to provide an improved optical density and color saturation on porous or semi-porous media. The fixer also generally improves color-to-color bleed, water-fastness, and highlighter smear.

The fixing agent may, for example, be chosen from a salt containing a multivalent cation, and may be present in the fixer in an amount ranging from about 3 wt % to about 16 wt % of the entire fixer composition. Some suitable examples of the fixing agent include calcium propionate, calcium acetate, and calcium butyrate.

As previously mentioned, the fixing agent may be dissolved in a fixer vehicle, which may include one or more solvents (e.g., tetraethylene glycol, 2-ethyl-2-(hydroxymethyl)-1,3-propanediol, or combinations thereof), surfactants (e.g., ethoxylated C11-C15 secondary alcohols, nonionic ethoxylated fluoroalkyl surfactants, or combinations thereof), and water.

In an example, an acid may be added to the fixer to adjust its pH to a value ranging from about 5 to about 7. Examples of the acid that may be added to the fixer include methane sulfonic acid, hydrochloric acid, nitric acid, hydrobromic acid, sulfuric acid, perchloric acid, hydroiodic acid, trifluoroacetic acid, and/or combinations thereof.

The examples of the ink set disclosed hereinabove are pigment-based inks that are configured to be inkjet printed. Printing may be accomplished via an inkjet printer, such as a thermal inkjet printer. It is believed that other inkjet printers may also be used, examples of which may include piezoelectric inkjet printers, other drop on demand inkjet printers, and/or continuous inkjet printers. In an example, the printer is part of the inkjet printing system 10, which is schematically shown in FIG. 1.

Figure 1:
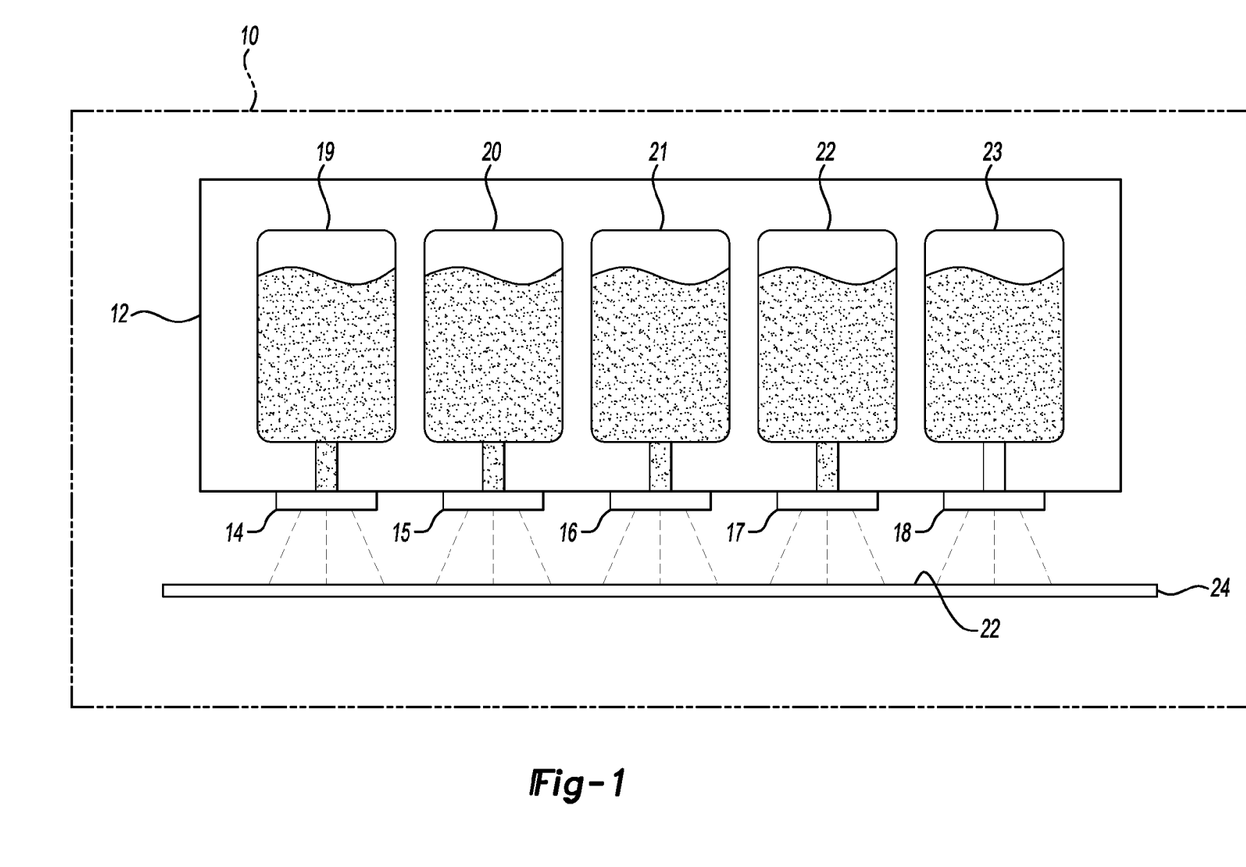
FIG. 1 is a schematic illustration of an example of an inkjet printing system that may be used for printing an ink retrieved, by the printing system, from examples of the ink set disclosed herein.

As shown in FIG. 1, the inkjet printing system 10 includes a printer 12 having, for example, five inkjet fluid ejectors 14, 15, 16, 17, and 18. Each of the fluid ejectors 14, 15, 16, 17, 18 is fluidically coupled to respective chambers 19, 20, 21, 22, and 23 which are operatively positioned inside the printer 12. In an example, one of the chambers of the system 10 (e.g., the chamber 19) contains one of the inks of the ink set (such as the black ink), while another one of the chambers (e.g., the chamber 20) contains another one of the inks of the ink set (such as the yellow ink). The remaining chamber (e.g., chamber 23) may contain a fixer composition. Each of the fluid ejectors 14, 15, 16, 17, 18 is configured to eject its respective ink onto a surface 22 of a print media 24, where the inks are retrieved from their respective chambers 19, 20, 21, 22, 23 during printing.

It is to be understood that the printer 12 may also include additional fluid ejectors (not shown in FIG. 1), each of which is fluidically coupled to at least one other chamber (also not shown in FIG. 1). For example, the inkjet printing system 10 may include an ink set having five inks and a fixer composition, each of which is stored in a respective chamber. As such, at least one other chamber may contain another colored ink (e.g., a green ink), if desired. Alternately, all six chambers could contain different colored inks with no fixer composition. In either of these cases, the printer 12 would include at least six fluid ejectors and six chambers. However, it is to be understood that any suitable or desired number of fluid ejectors and chambers may be used. Further, it is to be understood that the ink chambers may be in fluid communication with a single fluid ejector, or may be in fluid communication with their own respective fluid ejectors.

To further illustrate the present disclosure, examples are given herein. It is to be understood that these examples are provided for illustrative purposes and are not to be construed as limiting the scope of the disclosure.

EXAMPLES

Example 1

Two magenta inks were prepared; one including a colorant chosen from Pigment Red (PR) 122 and one including a colorant chosen from PR 282. For each of these inks, the respective pigment was dispersed in a styrene acrylic dispersant and then mixed with an ink vehicle. The formulation of the ink vehicle (which was the same for both of the magenta inks) is as follows: about 10 wt % tripropylene glycol; about 5 wt % 1-(2-hydroxyethyl)-2-imidazolidinone; about 0.75 wt % ethoxylated C11-C15 secondary alcohols; about 0.75 wt % of a phosphate ester based on oleyl alcohol; about 0.50 LEG-1; about 0.05 wt % of a nonionic ethoxylated fluoroalkyl surfactant; about 0.10 wt % PROXEL® GXL; about 0.20 wt % JONCRYL® 683; and the balance deionized water. Further, the loading of the magenta pigment was about 3.5 wt % for both of the inks. The inks were then titrated to a pH of about 8.9 using a potassium hydroxide pH buffer. In this example, none of the inks included a polyurethane binder.

Figure 2:
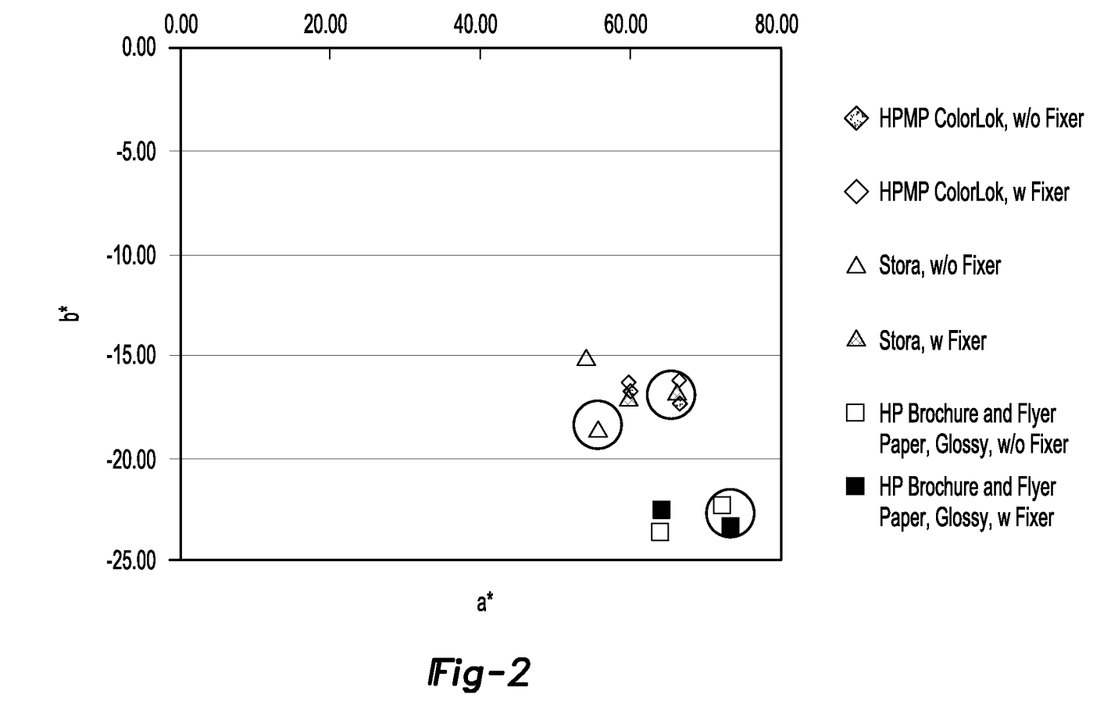
FIG. 2 is a graph showing a comparison of the color space values a* and b* for two different magenta inks.

FIG. 2 is a graph showing a comparison of the color space values a* and b* for twelve print samples; six samples produced by printing the magenta ink including PR 122 pigment (as shown by non-circled data points on the graph) and six samples produced by printing a magenta ink including PR 282 pigment (as shown by the circled data points on the graph). Each set of six print samples shown in FIG. 2 included a print sample produced on HP ColorLok® paper (available from Hewlett-Packard Co.), paper produced by Stora Enso (Finland), and HP Brochure and Flyer paper (also available from Hewlett-Packard Co.), with and without using a fixer.

As shown in FIG. 2, a* and b* of the print samples produced using the magenta ink including the PR 282 colorant appears redder than those samples produced using the magenta ink including the PR 122 pigment. This determination was based, at least in part, on the showing (from the graph in FIG. 2) that the chroma values (which are distances to the origin) for the print samples produced using the magenta ink including the PR 282 pigment were higher than the chroma values for the other print samples using PR 122, regardless of the type of paper the ink was printed on. It was also determined that the use of a fixer did not affect the chroma value comparison between PR 282 and PR 122.

Example 2

Two ink sets were prepared, where each included a black ink, a yellow ink, a magenta ink, and a cyan ink. Each ink set also included a fixing fluid composition. For Ink Set 1, all of the inks were inks commercially available from Hewlett-Packard Co. (Palo Alto, Calif.), where the black ink was chosen from CH581, the cyan ink was chosen from CH582, the magenta ink was chosen from CH583, and the yellow ink was chosen from CH584. Furthermore, the fixer was also commercially available from Hewlett-Packard Co., and was chosen from CH585. The magenta ink in this ink set (i.e., Ink Set 1) included PR 122 pigment.

For Ink Set 2, all of the inks (i.e., the cyan, magenta, yellow, and black inks) included a polyurethane binder. The formulation of the ink vehicles for each of these inks is as follows: about 8 wt % 1,3-bis(2-hydroxyethyl)-5,5-dimethylhydantoin, about 1.5 wt % 1,(2-hydroxyethyl)-2-pyrrolidinone, about 0.75 wt % of an ethoxylated C11-C15 secondary alcohol, about 0.75 wt % of a phosphate ester based on oleyl alcohol, about 1 wt % LEG-1, about 0.05 wt % of a nonionic ethoxylated fluoroalkyl surfactant, about 0.65 wt % SURFYNOL® SEF, about 0.1 wt % PROXEL® GXL, and the balance being water. The inks further included about 1.5 wt % of a water-soluble polyurethane having an acid number of about 40, and a weight average molecular weight ranging from 36,000 to 90,000. The magenta ink in Ink Set 2 included about 3.5 wt % of PR 282 pigment. The inks were also titrated with potassium hydroxide (KOH) to a pH of about 8.9.

Figure 3A:
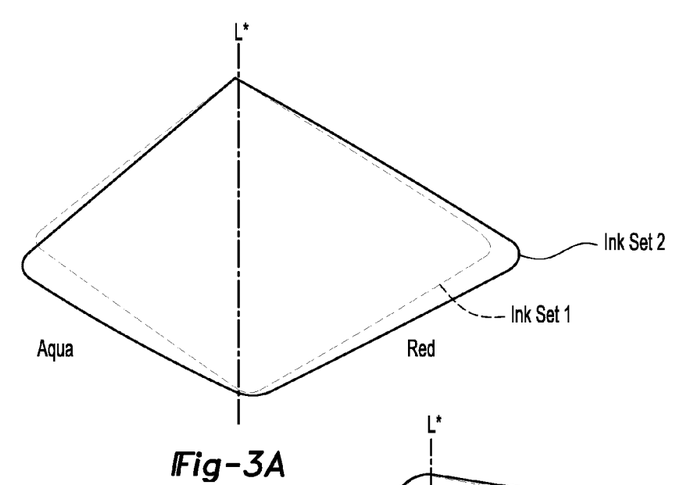
FIGS. 3A through 3C are graphs showing the hue cross sections for aqua to red (FIG. 3A), blue to yellow (FIG. 3B), and purple to green (FIG. 3C) for inks that are members of two different ink set samples printed on one type of media.
Figure 3B:
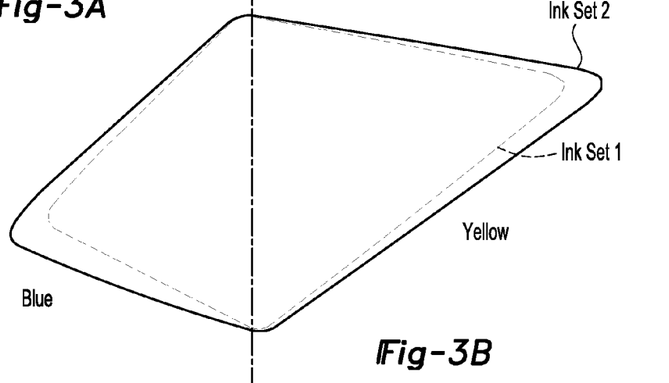
Figure 3C:
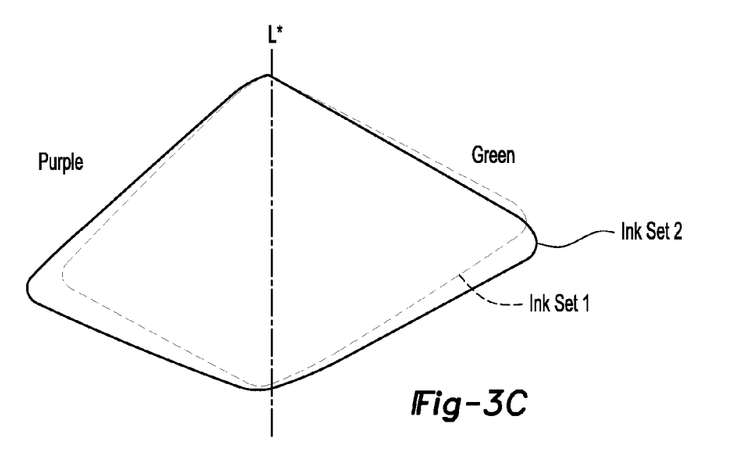

The hue cross sections for aqua to red, blue to yellow, and purple to green are shown in FIGS. 3A, 3B, and 3C, respectively, for Ink Sets 1 and 2 when printed on BOISE® Offset Smooth 50 lb Text paper (Boise, Inc. (Boise, Id.)). More specifically, these graphs compare the inks from Ink Sets 1 and 2 at three different hue cross sections; i.e., red, green, and blue slices taken at hue angles 24°, 144°, and 262°, respectively.

It is to be understood that in FIGS. 3A-3C and 4A-4C, the larger the projection area, the larger the gamut volume.

As shown in FIGS. 3A through 3C, the inks from Ink Set 2 (identified by the solid line in the figures), when printed, can hit more of the purple and red colors in comparison to the inks from Ink Set 1 (identified by the dotted line in the figures). However, the inks from Ink Sets 1 and 2 both performed similarly for the greens, blues, and yellows. Thus, the inks printed from Ink Set 2 (i.e., which included the magenta ink including the PR 282) shows an improved color gamut over the inks printed from Ink Set 1.

Figure 4A:
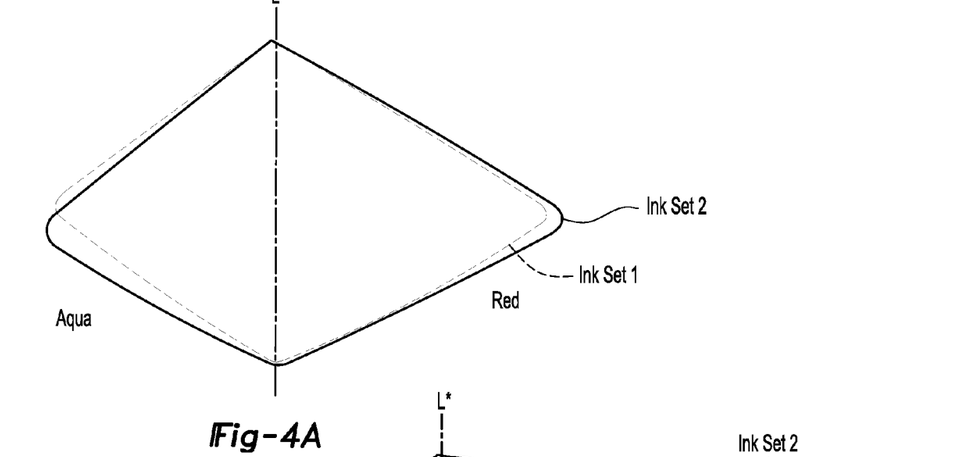
FIGS. 4A through 4C are graphs showing the hue cross sections for aqua to red (FIG. 4A), blue to yellow (FIG. 4B), and purple to green (FIG. 4C) for inks that are members of two different ink set samples printed on another type of media.
Figure 4B:
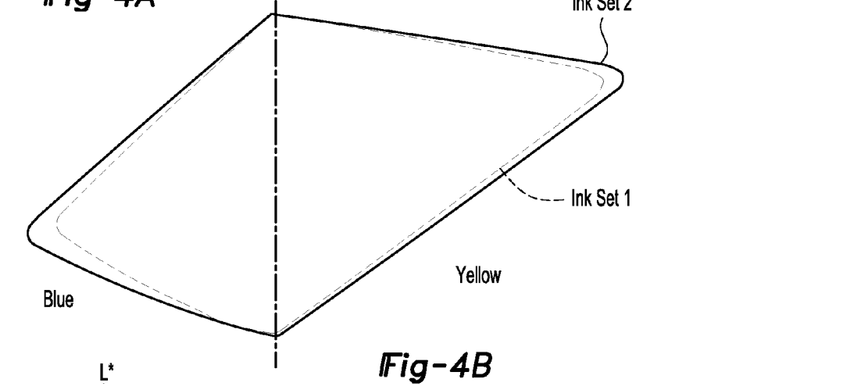
Figure 4C:
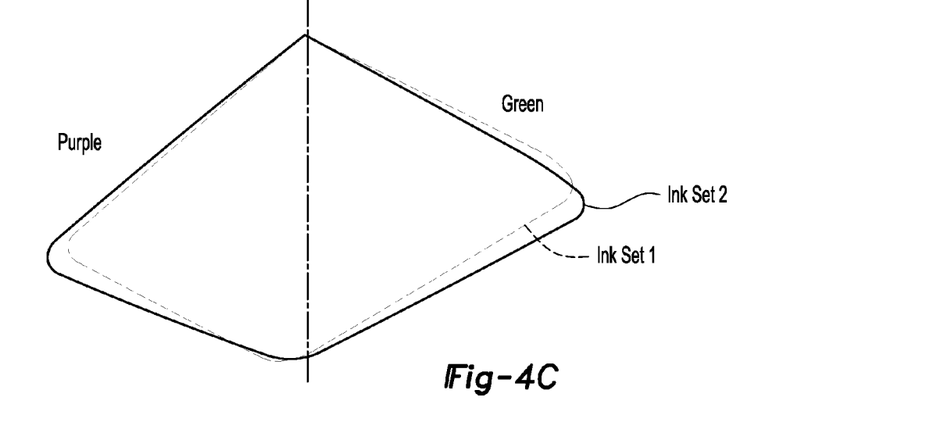

FIGS. 4A, 4B, and 4C show the same hue cross sections as FIGS. 3A, 3B, and 3C, respectively, for Ink Sets 1 and 2 when printed on UTOPIA® Inkjet 60 lb Dull Text paper (Appleton Coated, LLC (Kimberly, Wis.)). This example shows that the ink from Ink Set 2 (again, identified by a solid line in the figures), when printed, can hit more of the purples and reds, showing an improvement in gamut volume compared to the inks printed from Ink Set 1.

Figure 5A:
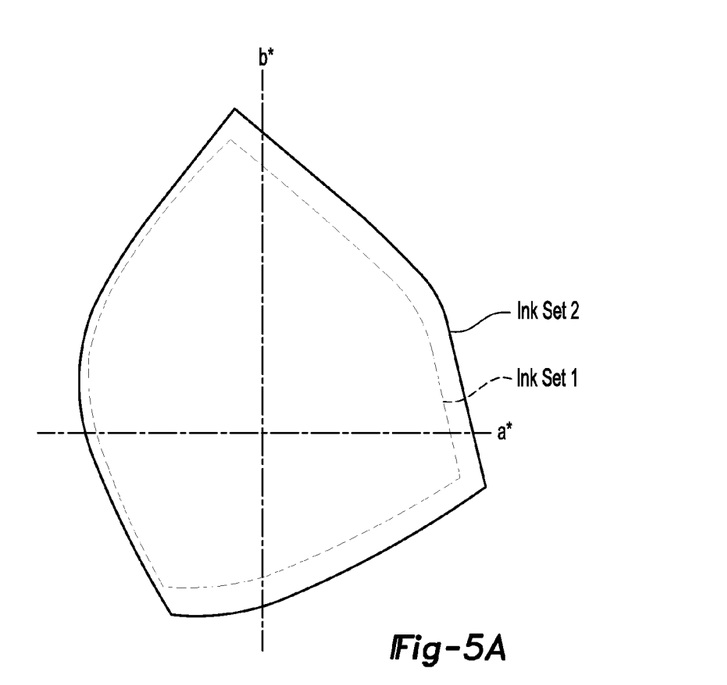
FIGS. 5A and 5B are graphs showing the a* and b* projection areas for print samples produced using inks from two different ink sets printed on one type of media (FIG. 5A) and on another type of media (FIG. 5B)
Figure 5B:
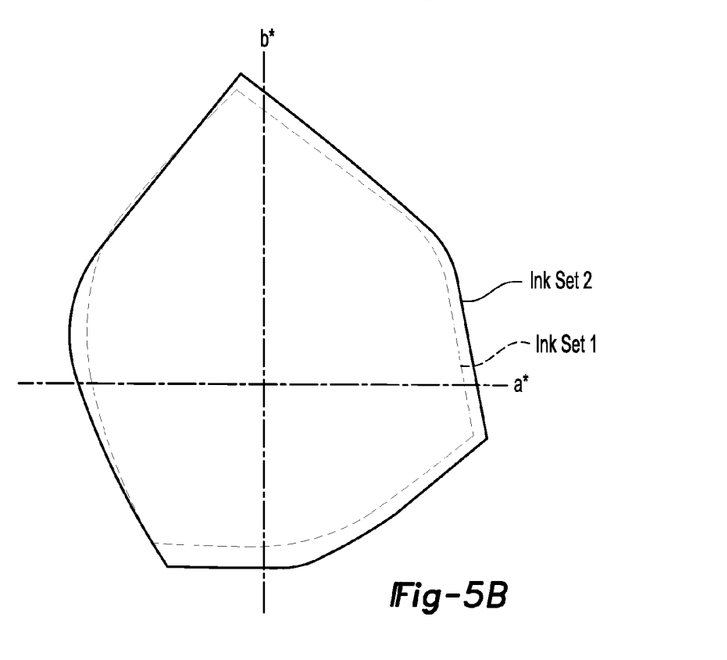

Additionally, FIGS. 5A and 5B are graphs showing the a* and b* projection area at a total ink density of less than or equal to 80 ng per 300 dpi (dots per inch) for both Ink Sets 1 and 2. The graphs show that the inks from Ink Set 2 (identified by the solid line), when printed on either BOISE® Offset Smooth 50 lb Text paper or UTOPIA® Inkjet 60 lb Dull Text paper, cover more of the a* and b* projection area than the inks from Ink set 1 when printed on the same papers.

Example 3

Seventeen black inks were prepared and tested to determine the trade-off between ink durability and reliability. Ink 1 was prepared as a control ink, while the other sixteen inks were prepared with a variation in black pigment loading, polyurethane binder loading, solvent loading, and anti-kogation agent loading. The formulation of each of the inks is summarized in Table 1 below:

TABLE 1

Formulation of Inks 1 through 17

|  | Pigment (wt %) | Polyurethane (wt %) | 1,3-bis(2-hydroxyethyl)-5,5-dimethylhydantoin (wt %) | phosphate ester based on oleyl alcohol (wt %) |
| --- | --- | --- | --- | --- |
| Ink 1 (Control ink) | 2.75 | 1 | 8 | 0.5 |
| Ink 2 | 2.5 | 0 | 6 | 0 |
| Ink 3 | 2.5 | 1.5 | 6 | 0 |
| Ink 4 | 2.5 | 0 | 10 | 0 |
| Ink 5 | 2.5 | 0 | 6 | 1 |
| Ink 6 | 2.5 | 0 | 10 | 1 |
| Ink 7 | 2.5 | 1.5 | 10 | 0 |
| Ink 8 | 2.5 | 1.5 | 10 | 1 |
| Ink 9 | 2.5 | 1.5 | 6 | 1 |
| Ink 10 | 3 | 0 | 6 | 0 |
| Ink 11 | 3 | 1.5 | 6 | 0 |
| Ink 12 | 3 | 0 | 10 | 0 |
| Ink 13 | 3 | 0 | 6 | 1 |
| Ink 14 | 3 | 0 | 10 | 1 |
| Ink 15 | 3 | 1.5 | 10 | 0 |
| Ink 16 | 3 | 1.5 | 10 | 1 |
| Ink 17 | 3 | 1.5 | 6 | 1 |

Inks 1 through 17 also included about 1 wt % LEG-1, about 1.5 wt % 1,(2-hydroxyethyl)-2-pyrrolidinone, about 0.14 wt % KODEK™ MLX, about 0.85 wt % SURFYNOL® SEF, about 0.05 wt % of a nonionic ethoxylated fluoroalkyl surfactant, about 0.10 wt % PROXEL® GXL, and the balance water. The inks also included a black pigment dispersed by a styrene acrylic dispersant, and a polyurethane binder having an acid number of 55 and a weight average molecular weight of 42,000. The amounts of the pigment and the polyurethane binder used in the black ink samples are shown in Table 1 above. Further, the pH of each of these inks was adjusted to be about 9.2.

The inks set forth in Table 1 were printed on various types of media including International Paper Accent Opaque, HP Office Paper with ColorLok® (Hewlett-Packard Co. (Palo Alto, Calif.)), and UTOPIA® Inkjet 60 lb Dull Text paper using an HP EDGELINE® printer (Hewlett-Packard, Co.). In this example, a fixer (examples of which are described above) was printed on the paper underneath the ink.

The short term decap, highlighter smear resistance, Sutherland dry rub resistance, and optical density were tested for each of these inks. The results of each of these tests are also summarized in Table 2 below.

The short term decap for Inks 1 through 17 was determined by printing a high density block to exercise all of the nozzles, immediately followed by a diagnostic nozzle health pattern. The nozzles then fired three spits per nozzle every 1.25 seconds for 120 seconds, and then the diagnostic pattern was printed again. The number of missing nozzles was counted to determine the level of decap. The results for short term decap for the inks that include the polyurethane binder (i.e., Inks 1, 3, 7, 8, 9, 11, 15, 16, and 17) and the results for short term decap for inks that do not include a polyurethane binder (i.e., Inks 2, 4, 5, 6, 10, 12, 13, and 14) are summarized in Table 2 below. From these results, it was found that the short term decap for Inks 11 and 17 (which had a high pigment and polyurethane loading, but a low loading of solvent) was worse than for the other inks tested. Inks 7, 15, and 16 (each of which had a high loading of solvent and polyurethane) exhibited an improved short term decap performance. All of the other inks (i.e., Inks 2, 3, 4, 5, 6, 8, 9, 10, 12, 13, and 14) were all considered to be desirable in terms of short term decap. It was therefore determined that inks having a high polyurethane loading and a high pigment loading was unfavorable for short term decap performance, while those inks having a higher loading of solvent and a lower loading of pigment improves decap.

TABLE 2

Print Test Summary for Inks 1 through 17

| | Ink | International Paper Accent Opaque | | | HP Office Paper with ColorLok® | | | UTOPIA® Inkjet 60 lb Dull Text | | | Suth/ Dry Rub (mOD) | Image Ranking after Suth/Dry Rub | Decap (120 s) |
|---|---|---|---|---|---|---|---|---|---|---|---|---|---|
| | | 1 pass HLS | 2 pass HLS | OD | 1 pass HLS | 2 pass HLS | OD | 1 pass HLS | 2 pass HLS | OD | | | |
| With Polyurethane | 1 | 0 | 37 | 1.19 | 17 | 103 | 1.43 | 27 | 120 | 1.52 | 15 | 0 | 1 |
| | 3 | 0 | 23 | 1.12 | 13 | 70 | 1.34 | 17 | 107 | 1.48 | 15 | 0 | 2 |
| | 8 | 0 | 30 | 1.07 | 10 | 93 | 1.33 | 10 | 83 | 1.41 | 15 | 0 | 1 |
| | 9 | 3 | 70 | 1.14 | 10 | 193 | 1.37 | 37 | 243 | 1.51 | 25 | 1 | 1 |
| | 7 | 0 | 33 | 1.14 | 17 | 83 | 1.37 | 33 | 110 | 1.49 | 10 | 0 | 3 |
| | 11 | 0 | 53 | 1.22 | 20 | 93 | 1.42 | 40 | 127 | 1.58 | 5 | 0 | 11 |
| | 16 | 0 | 43 | 1.13 | 10 | 120 | 1.42 | 23 | 87 | 1.52 | 10 | 0 | 3 |
| | 17 | 0 | 43 | 1.14 | 7 | 100 | 1.43 | 20 | 83 | 1.54 | 10 | 0 | 8.5 |
| | 15 | 0 | 23 | 1.22 | 0 | 90 | 1.45 | 27 | 97 | 1.56 | 15 | 0 | 2.5 |
| Without Polyurethane | 2 | 13 | 70 | 1.30 | 47 | 167 | 1.49 | 63 | 220 | 1.52 | 35 | 1 | 1 |
| | 6 | 7 | 60 | 1.10 | 20 | 193 | 1.35 | 50 | 197 | 1.43 | 40 | 1 | 1 |
| | 5 | 3 | 63 | 1.13 | 20 | 180 | 1.35 | 27 | 217 | 1.48 | 30 | 0 | 1 |
| | 4 | 13 | 70 | 1.23 | 43 | 160 | 1.47 | 90 | 223 | 1.50 | 50 | 2 | 1 |
| | 10 | 13 | 87 | 1.33 | 37 | 177 | 1.54 | 110 | 267 | 1.63 | 30 | 1 | 1 |
| | 14 | 7 | 80 | 1.17 | 30 | 210 | 1.42 | 77 | 253 | 1.54 | 100 | 5 | 1 |
| | 13 | 7 | 73 | 1.19 | 10 | 203 | 1.43 | 73 | 233 | 1.58 | 65 | 3 | 1 |
| | 12 | 23 | 103 | 1.31 | 47 | 183 | 1.50 | 130 | 303 | 1.58 | 150 | 5 | 1 |

Inks 1 through 17 were also tested to determine the trade-off between durability and reliability. This was accomplished by testing their respective resistances to highlighter smear for one and two passes, and their scratch resistance. The test for the resistance to highlighter smear was accomplished by printing the ink onto a medium using a pattern of parallel ⅛ inch, 100% density bars spaced ¼ inch apart, and after about 24 hours, passing a Faber Castell alkaline highlighter over the printed ink at a predetermined speed and pressure. The optical density of the color transferred between bars, expressed in mOD, was measured (using an X-Rite or other similar device) and recorded. The larger numbers of the mOD in Table 2 above indicate that the print was less durable.

Further, the print optical density OD was determined by X-Rite measurements in the 100% density print areas. The dry rub resistance test was performed with a standard Sutherland Dry Rub tester about 24 hours after printing one inch, 100% density squares on UTOPIA® Inkjet 60 lb Dull Text. The squares were rubbed by another piece of the same media ten times using a 4 lb weight. The samples were then graded on a visual scale from zero (no visible scratching) to 5 (severely scratched) and the mOD transferred adjacent to the squares.

As shown in Table 2 above, the presence of the anti-kogation agent (i.e., a phosphate ester based on oleyl alcohol) contributes very little, if at all, on the durability of the ink (e.g., in terms of highlighter smear and dry rub resistance). The presence of the anti-kogation agent does, however, lower the optical density of the inks. Further, the inks including the polyurethane binder were much more durable than those that do not include polyurethane binder, however the presence of the binder degrades the decap mostly with those inks having a higher pigment loading (e.g., a 3 wt % pigment loading).

The results showed that the presence and/or the loading of the solvent (i.e., 1,3-bis(2-hydroxyethyl)-5,5-dimethylhydantoin) does not affect the durability of the inks, however the presence of the solvent did improve the decap. Further, it was found that the loading of the pigment, in the range tested, also did not appear to adversely affect the durability of the inks. However, at higher pigment loadings tested (3 wt %), the optical density did not significantly improve.

Example 4

Seven cyan inks were prepared and tested to show decap as a function of pigment loading and binder loading in the ink. The ink vehicle for each of these ink samples included an LEG-1 solvent, a polyurethane binder having an acid number of 55 and a weight average molecular weight of 42,000, a cyan pigment chosen from PB 15:3, about 1.5 wt % of 1,(2-hydroxyethyl)-2-pyrrolidinone, about 8 wt % 1,3-bis(2-hydroxyethyl)-5,5-dimethylhydantoin, about 1 wt % of a phosphate ester based on oleyl alcohol, about 0.05 wt % of a nonionic ethoxylated fluoroalkyl surfactant, and about 0.65 wt % SURFYNOL® SEF. The amounts of the pigment, solvent, and polyurethane binder included in the seven cyan inks, as well as the results for the decap are shown in Table 3 below:

TABLE 3

Cyan ink samples 1 through 7

| Sample | Pigment (wt %) | LEG-1 (wt %) | Polyurethane (wt %) | Decap |
|---|---|---|---|---|
| 1 | 2.5 | 1.5 | 0.75 | 4 |
| 2 | 2.5 | 1 | 0.75 | 3.5 |
| 3 | 2.5 | 1 | 0.50 | 3 |
| 4 | 2.25 | 1.5 | 0.75 | 3.75 |
| 5 | 2.25 | 1 | 0.75 | 2.75 |
| 6 | 2.25 | 1 | 0.50 | 2.5 |
| 7 | 2.25 | 1.5 | None | 1 |

Decap was determined as previously described for Example 3. A decap rating was assigned for each printed ink, where the value 1 means that decap performance was the best, and a value of 5 means that decap performance was the worst. As shown in Table 3 above, decap performance improved with lower pigment and binder loadings (i.e., Cyan Ink Samples 4, 5, and 6 compared to Cyan Ink Samples 1, 2, and 3, respectively). The Cyan Ink Sample 7 showed the best decap performance, however this ink did not include a polyurethane binder. It is believed, based, at least in part, on the other examples disclosed herein, that the presence of the polyurethane binder in the inks improves durability. It is further believed that Ink 7 would not exhibit the durability performance (e.g., in terms of highlighter smear and dry rub resistance) that Inks 1-6 would otherwise exhibit, at least because Ink 7 does not include the polyurethane binder.

Example 5

Several magenta inks were prepared and tested for short term decap, durability (in terms of highlighter smear), and deceleration. Each of these inks included an ink vehicle containing about 1 wt % of LEG-1, about 1.5 wt % of 1,(2-hydroxyethyl)-2-pyrrolidone, about 8 wt % 1,3-bis(2-hydroxyethyl)-5,5-dimethylhydantoin, about 0.65 wt % SURFYNOL® SEF, about 0.75 wt % of a phosphate ester based on oleyl alcohol, about 0.05 wt % of a nonionic ethoxylated fluoroalkyl surfactant, about 0.10 wt % PROXEL® GXL, and the balance being de-ionized water. The magenta inks further included about 1 wt % of a polyurethane binder and about 3.5 wt % of PR 282 pigment. Each of the magenta inks included a different polyurethane binder, where each differed in its molecular weight and acid number, which are summarized in Table 4 below:

TABLE 4

Magenta inks with different polyurethanes

| Magenta Ink | Polyurethane | |
|---|---|---|
| | Acid Number | Molecular Weight |
| 1 | 55 | 42,000 |
| 2 | 55 | 51,000 |
| 3 | 60 | 40,000 |
| 4 | 60 | 43,000 |
| 5 | 65 | 41,000 |
| 6 | 65 | 50,000 |
| 7 | 50 | 41,000 |
| 8 | 60 | 41,000 |
| 9 | 41 | 41,000 |

Figure 6:
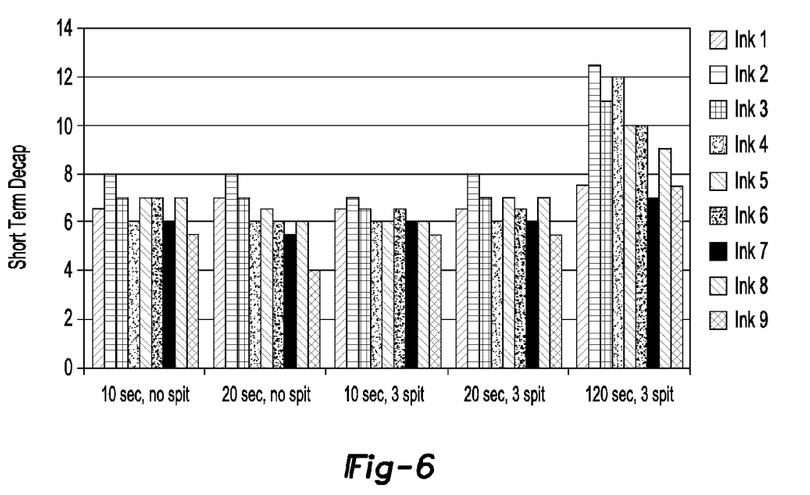
FIG. 6 is a graph showing the short term decap for several samples of a magenta ink, each including a different polyurethane binder.

The short term decap was tested by creating plots printed using an HP CM8060 Color Multifunctional Printer. A one inch square block was printed to make sure all of the nozzles of the printer were firing properly, which was followed by a diagnostic pattern showing the health of each nozzle. The nozzles remained unfired for 10 seconds, 20 seconds, and 120 seconds, and then the diagnostic pattern was printed again. The data for 10 seconds and 20 seconds was obtained with and without 3 spits per nozzle every 1.25 seconds during the idle time, while the data for 120 seconds was obtained with 3 spits every 1.25 seconds only. The decap (i.e., the difference in the number of missing nozzles before and after idle time) was recorded, and the results are shown in FIG. 6 and summarized in Table 5.

TABLE 5

Short term decap of magenta inks including a polyurethane binder

| Magenta Ink | Average number of Nozzles out at Various Decap Conditions | | | | |
|---|---|---|---|---|---|
| | 10 s, no spits | 20 s, no spits | 10 s, 3 spits | 20 s, 3 spits | 120 s, 3 spits |
| 1 | 6.5 | 7.0 | 6.5 | 6.5 | 7.5 |
| 2 | 8.0 | 8.0 | 7.0 | 8.0 | 12.5 |

TABLE 5-continued

Short term decap of magenta inks including a polyurethane binder

| Magenta Ink | Average number of Nozzles out at Various Decap Conditions | | | | |
|---|---|---|---|---|---|
| | 10 s, no spits | 20 s, no spits | 10 s, 3 spits | 20 s, 3 spits | 120 s, 3 spits |
| 3 | 7.0 | 7.0 | 6.5 | 7.0 | 11.0 |
| 4 | 6.0 | 6.0 | 6.0 | 6.0 | 12.0 |
| 5 | 7.0 | 6.5 | 6.0 | 7.0 | 10.0 |
| 6 | 7.0 | 6.0 | 6.5 | 6.5 | 10.0 |
| 7 | 6.0 | 5.5 | 6.0 | 6.0 | 7.0 |
| 8 | 7.0 | 6.0 | 6.0 | 7.0 | 9.0 |
| 9 | 5.5 | 4.0 | 5.5 | 5.5 | 7.5 |

As shown in Table 5 and in FIG. 6, the best short term decap times were obtained with magenta inks 1, 7, and 9, i.e., those inks that included the polyurethane having an acid number of 55 and a molecular weight of 42,000, the polyurethane having an acid number of 50 and a molecular weight of 41,000, and the polyurethane having an acid number of 41 and a molecular weight of 41,000, respectively.

The durability of the magenta ink (determined, e.g., in terms of the resistance to highlighter smear) was also tested by printing the different magenta inks on four different types of media: International Paper Accent Opaque (IPAO) 40 lb (a web press paper available from International Paper Corp. (Memphis, Term.)); a second web press (60 lb plain) paper from another manufacturer; HP Office Paper with Color-Lok® (a plain paper manufactured by Hewlett-Packard, Co.); and UTOPIA® Inkjet 60 lb Dull Text paper (Appleton Coated, LLC). The test samples produced included those where i) a fixer was printed on the IPAO 40 lb paper, and then the magenta ink was printed over the fixer (shown in Table 6), a fixer was printer on the second web press 60 lb paper, and then the magenta ink was printed over the fixer (shown in Table 7), iii) the magenta ink was printed on the IPAO 40 lb paper without a fixer (shown in Table 6), iv) the magenta ink was printed on the second web press 60 lb plain paper without a fixer (shown in Table 7), v) the magenta ink was printed on HP Office Paper with ColorLok® without a fixer (shown in Table 8), and vi) the magenta ink was printed on UTOPIA® Inkjet 60 lb paper without a fixer (shown in Table 9).

TABLE 6

One and two pass Highlighter Smear of Magenta Inks printed on IPAO 40 lb paper

| Magenta Ink | mOD Transfer | | | | | |
|---|---|---|---|---|---|---|
| | Fixer | | | Without Fixer | | |
| | 1-pass | 2-pass | OD | 1-pass | 2-pass | OD |
| 1 | 10 | 37 | 1.02 | 3 | 17 | 0.78 |
| 2 | 3 | 40 | 1.04 | 0 | 17 | 0.81 |
| 3 | 10 | 43 | 0.97 | 13 | 10 | 0.79 |
| 4 | 3 | 40 | 1.01 | 0 | 20 | 0.78 |
| 5 | 3 | 47 | 0.99 | 10 | 17 | 0.80 |
| 6 | 10 | 40 | 1.00 | 10 | 17 | 0.78 |
| 7 | 10 | 33 | 0.99 | 10 | 13 | 0.80 |
| 8 | 13 | 43 | 1.02 | 10 | 13 | 0.79 |
| 9 | 3 | 33 | 0.94 | 10 | 17 | 0.78 |

TABLE 7

One and two pass Highlighter Smear of Magenta Inks printed on web press 60 lb paper

|  | mOD Transfer | | | | | |
|---|---|---|---|---|---|---|
| Magenta | Fixer | | | Without Fixer | | |
| Ink | 1-pass | 2-pass | OD | 1-pass | 2-pass | OD |
| 1 | 13 | 100 | 1.11 | 10 | 7 | 0.76 |
| 2 | 23 | 113 | 1.21 | 10 | 13 | 0.77 |
| 3 | 17 | 133 | 1.12 | 10 | 13 | 0.77 |
| 4 | 13 | 117 | 1.14 | 23 | 17 | 0.78 |
| 5 | 17 | 140 | 1.14 | 10 | 10 | 0.76 |
| 6 | 17 | 110 | 1.13 | 10 | 10 | 0.76 |
| 7 | 13 | 90 | 1.11 | 23 | 13 | 0.76 |
| 8 | 13 | 67 | 1.06 | 13 | 10 | 0.77 |
| 9 | 13 | 60 | 1.02 | 17 | 17 | 0.74 |

TABLE 8

One and two pass Highlighter Smear of Magenta Inks printed on HP Office Paper with ColorLok ®

|  | mOD Transfer (Without Fixer) | | |
|---|---|---|---|
| Magenta Ink | 1-pass | 2-pass | OD |
| 1 | 10 | 30 | 1.00 |
| 2 | 23 | 37 | 1.04 |
| 3 | 17 | 53 | 0.95 |
| 4 | 17 | 70 | 1.05 |
| 5 | 20 | 80 | 1.06 |
| 6 | 20 | 60 | 1.03 |
| 7 | 27 | 47 | 1.04 |
| 8 | 27 | 50 | 0.96 |
| 9 | 27 | 40 | 0.94 |

TABLE 9

One and two pass Highlighter Smear of Magenta Inks printed on UTOPIA ® Inkjet 60 lb paper

|  | mOD Transfer (Without Fixer) | | |
|---|---|---|---|
| Magenta Ink | 1-pass | 2-pass | OD |
| 1 | 23 | 73 | 1.30 |
| 2 | 13 | 67 | 1.35 |
| 3 | 13 | 90 | 1.31 |
| 4 | 30 | 97 | 1.31 |
| 5 | 17 | 70 | 1.29 |
| 6 | 20 | 100 | 1.31 |
| 7 | 10 | 73 | 1.26 |
| 8 | 3 | 63 | 1.34 |
| 9 | 3 | 40 | 1.26 |

The results shown in Tables 6 through 9 show that the magenta inks 1 and 7 were less durable than ink 9. It was also observed that inks 1 and 7 exhibited slightly higher optical densities than the other inks, so it was expected that the durability of inks 1 and would be lower. It was further determined that the durability was unaffected by i) the type of paper upon which the magenta ink was printed, and ii) the use of a fixer.

Deceleration was also measured using two metrics, one of which utilized a rotating drum printer that printed a pattern at 20, 80, 120, and 160 inches per second (ips) in the form of a bar code. It is believed that the bar code following a long horizontal stripe pattern of about ⅛ inch thick pairs with ⅛ inch spacing between them is one way to detect deceleration, as the lines of the bar code become wavy as the lower velocity drops are misplaced in the pattern. The results of the test are shown in Table 10 below, where the deceleration grading was scaled to number 5 for no deceleration, and numbers 1-4 showing the various levels of deceleration, where 1 is considered to be extreme deceleration.

TABLE 10

Deceleration results for Inks 1 through 9

|  | Deceleration | | | |
|---|---|---|---|---|
| Magenta Ink | 20 ips | 80 ips | 120 ips | 160 ips |
| 1 | 5 | 5 | 5 | 5 |
| 2 | 5 | 5 | 5 | 5 |
| 3 | 5 | 5 | 5 | 5 |
| 4 | 5 | 5 | 5 | 5 |
| 5 | 5 | 5 | 5 | 5 |
| 6 | 5 | 5 | 5 | 5 |
| 7 | 5 | 5 | 5 | 5 |
| 8 | 5 | 5 | 5 | 5 |
| 9 | 5 | 5 | 4 | 3 |

It was found that inks 1 through 8 did not show any signs of deceleration at any print speed. However, ink 9 was the only ink that included a polyurethane binder that showed appreciable deceleration at higher speeds.

Figure 7:
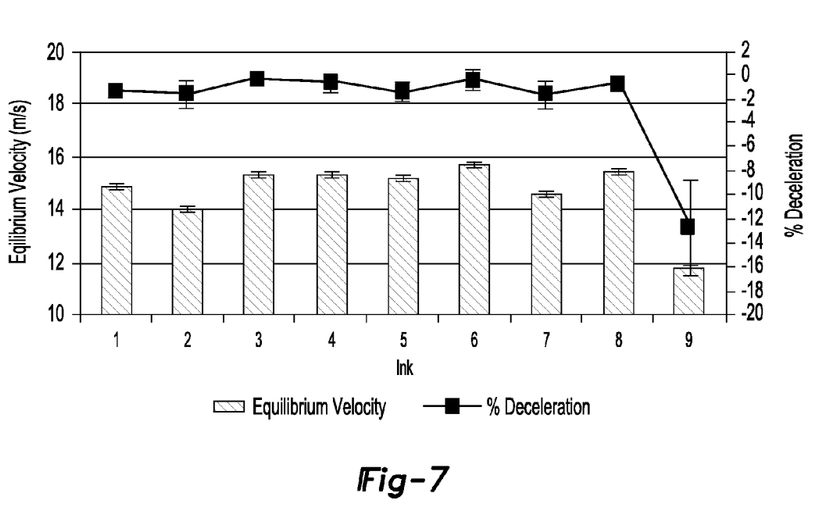
FIG. 7 is a graph showing the % deceleration and equilibrium velocity (m/s) of the magenta ink samples.

Table 11 provides the percent deceleration, or the percent (%) change of initial to equilibrium velocity of the magenta inks measured using an optical drop velocity tester. These results are also depicted in FIG. 7. In this test, drops were fired at 1 kHz for 5 seconds, and the velocity was measured using the optical drop detector every 30 milliseconds. The initial velocity and equilibrium velocity were used to calculate the percent change in velocity (% deceleration).

TABLE 11

Percent Deceleration results for Inks 1 through 9

| Magenta Ink | Average % Decel | Average Drop Velocity |
|---|---|---|
| 1 | −1.22 | 14.9 |
| 2 | −1.55 | 14.1 |
| 3 | −0.32 | 15.4 |
| 4 | −0.64 | 15.4 |
| 5 | −1.32 | 15.2 |
| 6 | −0.35 | 15.7 |
| 7 | −1.46 | 14.7 |
| 8 | −0.58 | 15.5 |
| 9 | −12.50 | 11.8 |

The foregoing results show that all of the inks except for ink 9 had little or a negligible percent deceleration, while Ink 9, on the other hand, had a % deceleration of about −12.5%. The results also show that the equilibrium velocity was substantially the same (e.g., ranged from about 14 m/s to about 16 m/s) for all of the inks except for Ink 9, which was considerably lower than the other inks tested. These results also show that all of the polyurethanes used to form the inks formed stable magenta inks, except for Ink 9. Furthermore, Inks 1 and 7 included polyurethanes that rendered the inks the best choices in terms of decap, and Inks 1 through 8 were slightly worse than Ink 9 in terms of highlighter smear transfer, but these inks (i.e., Inks 1 through 8) had desirable deceleration properties.

It is to be understood that concentrations, amounts, and other numerical data have been presented herein in range format. It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 5 wt % to about 20 wt % should be interpreted to include not only the explicitly recited concentration limits of about 5 wt % to about 20 wt %, but also to include individual concentrations such as 6 wt %, 7 wt %, 10 wt %, 12 wt %, 15 wt %, etc., and sub-ranges such as 10 wt % to 15 wt %, 12 wt % to 20 wt %, etc. Furthermore, when "about" is utilized to describe a value, this is meant to encompass minor variations (up to +/−5%) from the stated value.

It is further to be understood that, as used herein, the singular forms of the articles "a," "an," and "the" include plural references unless the content clearly indicates otherwise.

Additionally, the term "any of", when used in conjunction with lists of components (e.g., solvents, additives, etc.) refers to one of the components included in the list alone or combinations of two or more components. For instance, the term "any of", when used with reference to an additive, includes i) a biocide alone, ii) an anti-kogation agent alone, iii) a pH buffering agent alone, iv) or combinations of two or more of these additives.

While several examples have been described in detail, it will be apparent to those skilled in the art that the disclosed examples may be modified. Therefore, the foregoing description is not to be considered limiting.

What is claimed is:

1. An inkjet ink set, consisting of:
   an aqueous black ink;
   an aqueous yellow ink;
   an aqueous cyan ink;
   an aqueous magenta ink, including:
      a first ink vehicle; and
      a dispersed magenta pigment in the first ink vehicle, wherein the magenta pigment is Pigment Red 282;
   a fixer vehicle including water; and
   a fixing agent dispersed in the fixer vehicle, wherein the fixing agent is calcium propionate or calcium butyrate;
   wherein the aqueous black ink includes a second ink vehicle, the aqueous yellow ink includes a third ink vehicle, and the aqueous cyan ink includes a fourth ink vehicle, wherein each of the aqueous black, aqueous yellow, and aqueous cyan inks individually includes a respective dispersed black, yellow and cyan pigment, and wherein each of the first, second, third and fourth ink vehicles includes a water-soluble polyurethane binder;
   wherein, each of the first, second, third, and fourth ink vehicles individually further includes:
      a solvent system of about 8 wt % 1,3-bis(2-hydroxyethyl)-5 5,-dimethylhydantoin, about 1.5 wt % 1,2-hydroxyethyl-2-pyrrolidinone, and from 0 wt % to 1.5 wt % of a glycerol polyoxyethyl ether;
      optionally an additive chosen from any of a biocide, an anti-kogation agent, a surfactant, or a pH buffering agent; and
      water as a balance.

2. The inkjet ink set as defined in claim 1 wherein the polyurethane binder has a weight average molecular weight ranging from about 20,000 to about 100,000.

3. The inkjet ink set as defined in claim 1 wherein the polyurethane binder has an acid number ranging from about 40 to about 60.

4. The inkjet ink set as defined in claim 1 wherein the yellow pigment is chosen from Pigment Yellow 74, Pigment Yellow 155, Pigment Yellow 213, or Pigment Yellow 128.

5. The inkjet ink set as defined in claim 1 wherein the cyan pigment is chosen from Pigment Blue 15:3 or Pigment Blue 15:4.

6. The inkjet ink set as defined in claim 1 wherein each of the dispersed black, yellow, cyan and magenta pigments includes a dispersant chosen from a styrene acrylic polymer containing a carboxylate group.

7. The inkjet ink set as defined in claim 6 wherein the styrene acrylic polymer containing the carboxylate group has a weight average molecular weight ranging from about 5000 to about 20,000, and an acid number ranging from about 120 to about 200.

8. The inkjet ink set as defined in claim 6 wherein the styrene acrylic polymer anionically disperses the respective black, yellow, cyan and magenta pigments.

9. The inkjet ink set as defined in claim 1 wherein the cyan pigment is Pigment Blue 15:4.

10. The inkjet ink set as defined in claim 1 wherein the water-soluble polyurethane binder has an acid number of about 40, and a weight average molecular weight ranging from 36,000 to 90,000.

11. An inkjet printing system, consisting of:
    a first ink chamber including an aqueous black ink;
    a second ink chamber including an aqueous yellow ink;
    a third ink chamber including an aqueous cyan ink;
    a fourth ink chamber including an aqueous magenta ink, the aqueous magenta ink including a dispersed magenta pigment in an ink vehicle, wherein the magenta pigment is Pigment Red 282; and
    a fifth ink chamber including a fixer, the fixer including a fixing agent selected from the group consisting of calcium propionate and calcium butyrate;
    wherein each of the black ink, yellow ink, cyan ink, and the magenta ink includes an ink vehicle including at least a solvent system of about 8 wt % 1,3-bis(2-hydroxyethyl)-5,5-dimethylhydantoin, about 1.5 wt % 1,(2-hydroxyethyl)-2-pyrrolidinone, and from 0 wt % to 1.5 wt % of a glycerol polyoxyethyl ether, a water-soluble polyurethane binder, and a balance of water, the water-soluble polyurethane binder having a weight average molecular weight ranging from about 20,000 to about 100,000, and an acid number ranging from about 40 to about 60.

12. The inkjet printing system as defined in claim 11 wherein the acid number of the water-soluble polyurethane binder ranges from about 40 to less than 55.

* * * * *